(12) United States Patent
Zhan et al.

(10) Patent No.: US 12,433,706 B2
(45) Date of Patent: Oct. 7, 2025

(54) ENDOSCOPIC SURGICAL ROBOTS

(71) Applicant: BosEagle Surgical Inc., Potomac, MD (US)

(72) Inventors: Ying Zhan, Wuhan (CN); Guibin Zhou, Hangzhou (CN); Yuchao Li, Potomac, MD (US)

(73) Assignee: BosEagle Surgical Inc., Potomac, MD (US)

( * ) Notice: Subject to any disclaimer, the term of this patent is extended or adjusted under 35 U.S.C. 154(b) by 576 days.

(21) Appl. No.: 17/825,330

(22) Filed: May 26, 2022

(65) Prior Publication Data

US 2022/0287786 A1    Sep. 15, 2022

Related U.S. Application Data (63) Continuation of application No. PCT/US2021/015942, filed on Jan. 29, 2021.

(60) Provisional application No. 62/967,176, filed on Jan. 29, 2020.

(51) Int. Cl.
| | |
|---|---|
| A61B 34/37 | (2016.01) |
| A61B 1/00 | (2006.01) |
| A61B 1/015 | (2006.01) |
| A61B 17/22 | (2006.01) |
| A61B 34/30 | (2016.01) |

(52) U.S. Cl.
CPC .......... *A61B 34/37* (2016.02); *A61B 1/00135* (2013.01); *A61B 1/00137* (2013.01); *A61B 1/015* (2013.01); *A61B 17/22* (2013.01); *A61B 2034/301* (2016.02); *A61B 2217/005* (2013.01); *A61B 2217/007* (2013.01)

(58) Field of Classification Search
CPC .... A61B 34/30; A61B 2034/301; A61B 1/015
See application file for complete search history.

(56) References Cited

U.S. PATENT DOCUMENTS

| | | | |
|---|---|---|---|
| 6,447,473 | B1 | 9/2002 | Levine et al. |
| 6,547,724 | B1 | 4/2003 | Soble et al. |
| 9,616,564 | B2 | 4/2017 | Pfaff |
| 10,482,599 | B2 | 11/2019 | Mintz et al. |
| 10,828,051 | B2 | 11/2020 | Wan |
| D915,487 | S | 4/2021 | Sell |
| 11,534,249 | B2 | 12/2022 | Romo et al. |

(Continued)

FOREIGN PATENT DOCUMENTS

| | | |
|---|---|---|
| CN | 104146699 A | 11/2014 |
| CN | 104207821 A | 12/2014 |

(Continued)

OTHER PUBLICATIONS

International Search Report & Written Opinion in International Application No. PCT/US21/15942, mailed Apr. 22, 2021, 8 pages.

(Continued)

*Primary Examiner* — Todd J Scherbel
(74) *Attorney, Agent, or Firm* — Edell, Shapiro & Finnan, LLC (57) ABSTRACT

Disclosed herein are surgical robotics, and particularly a perfusion and suction pumping system of a medical instrument for operation within organs of a patient's body. Methods for using the same are also provided.

20 Claims, 10 Drawing Sheets

(56) References Cited

U.S. PATENT DOCUMENTS

| | | | | |
|---|---|---|---|---|
| 2005/0234293 | A1* | 10/2005 | Yamamoto | A61B 90/57 |
| | | | | 600/102 |
| 2009/0062611 | A1* | 3/2009 | Toyama | A61B 1/015 |
| | | | | 600/118 |
| 2015/0119645 | A1 | 4/2015 | Baldwin | |
| 2016/0184032 | A1 | 6/2016 | Romo et al. | |
| 2017/0252051 | A1 | 9/2017 | Wan et al. | |
| 2018/0055568 | A1 | 3/2018 | Shelton et al. | |
| 2018/0289394 | A1 | 10/2018 | Shah | |
| 2019/0175799 | A1 | 6/2019 | Hsu et al. | |
| 2020/0206472 | A1* | 7/2020 | Ma | A61B 5/201 |
| 2021/0330309 | A1* | 10/2021 | Ma | A61M 3/0202 |

FOREIGN PATENT DOCUMENTS

| | | | |
|---|---|---|---|
| CN | 108324234 | A | 7/2018 |
| CN | 109069136 | A | 12/2018 |
| CN | 110074867 | A | 8/2019 |
| CN | 111658149 | A | 9/2020 |
| CN | 112770689 | A | 5/2021 |
| CN | 113226202 | A | 8/2021 |
| JP | 2015-519146 | A | 7/2015 |
| JP | 2019-505245 | A | 2/2019 |
| JP | 2019-505261 | A | 2/2019 |
| JP | 2019-209116 | A | 12/2019 |
| KR | 10-2473254 | B1 | 12/2022 |
| WO | 2005/072402 | A2 | 8/2005 |
| WO | 2017/127595 | A1 | 7/2017 |

OTHER PUBLICATIONS

English translation of Notice of Reasons for Refusal in Japanese Application No. 2022-546558, dated Jul. 24, 2023, 4 pages.
English translation of Notice of Reasons for Refusal in Japanese Application No. 2022-546558, dated Dec. 28, 2023, 4 pages.

* cited by examiner

ENDOSCOPIC SURGICAL ROBOTS

CROSS REFERENCE TO RELATED APPLICATIONS

This application is a continuation of International Application No. PCT/US21/15942, filed Jan. 29, 2021, which claims priority to and the benefits of U.S. Provisional Application No. 62/967,176 filed Jan. 29, 2020. Each of these applications is incorporated herein by reference in its entirety.

FIELD

The present disclosure generally relates to surgical robotics, and particularly to a perfusion and suction pumping system of a medical instrument within organs of a patient's body.

BACKGROUND

Kidney stone is a common disease affecting men and women of all ages. The incidence of kidney stone disease is increasing about 10% worldwide each year. The probability of stone formation is 20.1% in Saudi Arabia and 13% in the USA. The recurrence rate of kidney stones could be 80%~90% in ten years. Percutaneous nephrolithotomy (PCNL) is the preferred technique for the surgical treatment of large kidney stones or stones that are resistant to other forms of treatment. PCNL may also be an alternative to retrograde intrarenal surgery (RIRS) for the treatment of stones measuring between 10 mm and 20 mm due to better stone-free rates achieved by a single procedure. PCNL can also be a major option for large impacted proximal ureteric stones and symptomatic calyceal diverticular stones treatment.

Percutaneous Nephrolithotomy (PCNL) is a medical procedure that allows a physician to remove a patient's kidney stones or ureter stones that are too large (over 20 mm) or too complex for other forms of stone treatment, such as shock wave lithotripsy or ureteroscopy. Kidney stones are formed in the urinary tract due to crystallization of chemical compounds in the urine, and PCNL is the standard procedure for large and complex kidney stones. During the medical procedure, a small 1 cm incision is made in the patient's flank area and a sheath is placed through the incision into the kidney under x-ray or ultrasound guidance. A small telescope called a percutaneous nephroscope is then passed through the sheath and the telescope is held by a physician throughout the operation in order to visualize the stone, break it up, and remove it from the body. If necessary, a laser or other device called a lithotripter may be used to break up the stone before it can be removed. Patients are generally anesthetized in prone or supine position during the medical procedure.

A conventional PCNL procedure typically includes a high-pressure irrigation method that allows irrigation fluid to flush the stone or stone fragments out of a patient's body and to maintain adequate visual clarity for a physician to perform the medical procedure. The pressure level of irrigation fluid is preset by the physician using a pressure pump device. Irrigation fluid is pumped by the pressure pump device and goes into a patient's kidney through the percutaneous nephroscope, and then comes out of a patient's body through the space between the percutaneous nephroscope and the sheath to an open-face waste collector. Typically, 5% saline is used as irrigation fluid.

Apart from methods, e.g., high-pressure irrigation method described above, various mechanical devices may be used to help with the surgical operations. As an example, the development of various lithotripsy devices and the introduction of the holmium laser improved the efficiency of stone fragmentation and clearance. A lithotripter or a laser may be used to break up the kidney stone before it can be removed during a PCNL medical procedure.

However, previous techniques for kidney stone removal still have challenges, even when using existing methods (e.g., high-pressure irrigation method) and when employing current medical devices (e.g., lithotripsy devices and holmium laser). As one example, the high-pressure irrigation method cannot efficiently manage the inside pressure of a patient's organs because it only presets a constant pressure level outside of a patient's body with no inside pressure measurement or control during the medical procedure. PCNL is usually conducted under high pressure to keep visual clarity of a physician, and the elevated renal pelvic pressures (RPPs) caused by the high-pressure irrigation method may spread infection through pyelovenous backflow. Moreover, stone fragments may be stuck between the percutaneous nephroscope and the sheath on the way out of a patient's body and block the outflow of irrigation fluid during the medical procedure. As a result, the pressure level inside of a patient's kidney increases sharply. Due to no pressure measurement or control inside of a patient's kidney, complications such as postoperative bleeding, tissue damage, injury to nearby organs or structures, and urinary sepsis with a mortality rate 20%~42% may occur. However, decreased pressures can hinder observation and increase bleeding. A physician may have to stop the medical procedure concerning about the patient's tolerance under high pressure irrigation. As a result, stone-free rate is low which leads to post-procedure kidney stone formation in the patient.

Furthermore, a physician must handhold a percutaneous nephroscope without rest throughout a PCNL procedure. Typically, the length of a PCNL procedure is three to four hours, and could be more than five hours in extreme cases when patients have large or complex kidney stones. As a result, surgery risk (e.g., complications, bleeding, and organ injury) is high due to long hours of operation, with a patient's organs under high pressure and due to the potential fatigue of the physician handholding the percutaneous nephroscope.

Thus, there is a need for improved techniques for pressure management inside of a patient's body during the medical procedure, and there is a need for improved techniques to remove stones more safely and efficiently.

SUMMARY

Provided herein, in one aspect, is an endoscopic surgical robotic system, comprising:
  an endoscope pre-selected according to a lesion (e.g., location and size) inside of an organ) in need of endoscopic surgery, wherein the endoscope comprises a fluid inlet channel for flowing an irrigation fluid to the organ;
  a sheath for guiding and housing the endoscope during the endoscopic surgery;
  a suction channel located within the sheath for removing the irrigation fluid from the organ;

a pressure measuring channel located along the sheath, constructed to measure a pressure within the organ at its proximal end and connected to a pressure detector at its distal end;

a pressure relief valve in fluid communication with the sheath, wherein once the pressure reaches a threshold, the pressure relief valve opens to allow removal of the irrigation fluid in the suction channel, thereby lowering pressure within the organ;

a first holder for holding the sheath;

a second holder for holding the endoscope, wherein the first holder and the second holder are designed to move co-axially so as to move the endoscope in and out of the sheath; and a robotic arm for controlling a movement of the sheath, wherein the robotic arm is connected to the first holder.

In some embodiments, the endoscope is selected from percutaneous nephroscope, ureteroscope, cystoscope, urethroscope, hysteroscope, arthroscope, spine endoscope, ventroscope, lacrimal duct endoscope, nasopharyngeal endoscope, and/or otoscope.

In some embodiments, the endoscopic surgical robotic system can further include a puncturable cap, optionally a rubber cap, located at a distal end of the sheath through which the endoscope is inserted into the sheath.

In some embodiments, the endoscopic surgical robotic system can further include a perfusion-suction pump for continuously pumping the irrigation fluid into the organ and continuously removing the irrigation fluid.

In some embodiments, the endoscopic surgical robotic system can further include a suction pump in fluid communication with the suction channel, for pumping out and removing the irrigation fluid from the organ.

In some embodiments, the pressure measuring channel is located inside of the sheath.

In some embodiments, the pressure detector monitors pressure in real time and is optionally connected to an electrocardiograph.

In some embodiments, the threshold is pre-determined according to the lesion, the organ, the sheath and/or a flow speed of the irrigation fluid, wherein optionally the threshold is about 40 cmH$_2$O.

In some embodiments, the first holder is constructed to removably hold the sheath via a first latch, and/or the second holder is constructed to removably hold the endoscope via a second latch.

In some embodiments, the endoscopic surgical robotic system can further include a holder bar for hanging the first holder and the second holder such that they can be moved back and forth along the holder bar, wherein optionally the holder bar is connected to the robotic arm via a connector.

In some embodiments, the robotic arm comprises a multi-degree-of-freedom actuator and a multi-degree-of-freedom control system, wherein the endoscope is fixed at an output end of the multi-degree-of-freedom actuator, and wherein a tool center point is defined on the endoscope by the multi-degree-of-freedom control system.

In some embodiments, the endoscopic surgical robotic system can further include a command console for controlling the robotic arm.

In some embodiments, the command console comprises a 3D controller and a control host, wherein a dimension of the 3D controller is matched with freedom degrees of the tool center point, wherein the control host associates dimension information from a multi-dimensional sensor of the 3D controller with freedom degree information from the tool center point.

In some embodiments, the 3D controller remotely controls the multi-degree-of-freedom actuator and endoscope.

In some embodiments, the tool center point is an entry point for incision.

In some embodiments, when the endoscope reaches the patient, the control host starts to restrict the endoscope to only move along its axial direction and rotate around the tool center point with pitch, roll, and yaw motion within a preset scope of a safety zone.

In some embodiments, the command console comprises a monitor module for displaying patient monitoring information such as electrocardiogram and blood pressure, intrarenal pressure values and curves, endoscopic images, perfusion and suction parameters, laser parameters, x-ray images and the like.

In some embodiments, the endoscopic surgical robotic system can further include a lithotripter for breaking up stones within the organ.

Also provided herein is a method for performing PCNL surgery, comprising using the endoscopic surgical robotic system disclosed herein.

Another aspect relates to a method for performing PCNL surgery, comprising:

inserting a sheath through a pre-cut incision on a patient, into an organ in need of endoscopic surgery, optionally under X-ray or ultrasound guidance;

placing an endoscope into the sheath, wherein the endoscope comprises a fluid inlet channel for flowing an irrigation fluid to the organ, and wherein the sheath comprises a suction channel located therein for removing the irrigation fluid from the organ;

continuously pumping the irrigation fluid via a perfusion pump into the fluid inlet channel;

continuously removing the irrigation fluid from the organ via a suction pump through the suction channel; and monitoring real-time pressure within the organ via a pressure measuring channel located along the sheath, wherein the pressure measuring channel is constructed to measure a pressure within the organ at its proximal end and connected to a pressure detector at its distal end, wherein once the pressure reaches a threshold, a pressure relief valve in fluid communication with the sheath opens to allow removal of the irrigation fluid in the suction channel, thereby lowering pressure within the organ.

Reference will now be made in detail to several embodiments, examples of which are illustrated in the accompanying figures. It is noted that wherever practicable similar or like reference numbers may be used in the figures and may indicate similar or like functionality. The figures depict embodiments of the described system (or method) for purposes of illustration only. One skilled in the art will readily recognize from the following description that alternative embodiments of the structures and methods illustrated herein may be employed without departing from the principles described herein.

DETAIL DESCRIPTION

The methods and apparatuses disclosed herein provide improved stone removal techniques by providing a robotic endoscopic system to assist a physician to control the movement of a medical instrument such as a flexible or rigid elongated medical instrument (e.g., a percutaneous nephroscope) within organs of a patient's body. It should be noted while the present disclosure uses PCNL and in particular kidney stone removal as an example, the methods and systems disclosed herein can be readily applied to other medical procedures, as one of ordinary skill in the art would appreciate. Such other medical procedures include, without limitation, percutaneous nephroscopy, ureteroscopy, cystoscopy, urethroscopy, hysteroscopy, arthroscopy, spine endoscopy, ventroscopy, lacrimal duct endoscopy, nasopharyngeal endoscopy and otoscopy.

As one example, the apparatus is a robotic percutaneous nephroscopic tool to accurately and safely stabilize a percutaneous nephroscope of a desired anatomical site during a PCNL procedure. The robotic percutaneous nephroscopic tool includes a robotic arm system, an endoscope connector coupled to the robotic arm, a percutaneous nephroscope, a pressure management system, a command console, an energy source (e.g., a laser device) and necessary layout accessories. Controlled by a physician with a real-time 3D controller, the robotic percutaneous nephroscopic tool operates a robotic arm accurately and intuitively to move a percutaneous nephroscope during a PCNL procedure. The robotic arm system comprises a multi-degree-of-freedom robotic arm actuator and robotic arm controller. A percutaneous nephroscope is fixed at an output end of the robotic arm actuator by an endoscope connector. A tool center point is defined on the percutaneous nephroscope by the robotic arm controller, and the dimension of the 3D controller is matched with the freedom degrees of the tool center point. The command console is used for associating the dimension information from the multi-dimensional sensor of the 3D controller with the freedom degree information from the tool center point.

In some embodiments, the 3D controller remotely controls the multi-degree-of-freedom robotic arm and the percutaneous nephroscope. The robotic arm controller defines the point of entry (i.e., incision) as the tool center point. When the endoscope device reaches to the patient, the command console starts to restrict the movement of the endoscope device. During the surgery, the command console only allows the endoscope device to move along its axial direction and rotate around the tool center point with pitch, roll, and yaw motion within a preset scope which is called a safety zone. The upper computer further includes a monitor module for displaying images sent by the imaging sensor attached to the endoscope device. Robotic endoscopic system provides tremendous advantages in accurately and safely assisting the movement control of an endoscope during medical procedures. It allows for more convenient, more efficient and safer operations by the physician. It is also easy to use because it is compatible with the standard medical procedure. Exemplary robotic arm systems suitable for the present disclosure include Kuka LBR iiwa, Kuka LBR Med, Universal Robot UR5e, Franka Emika Panda, Kinova Jaco, etc.

Furthermore, the methods and apparatuses disclosed herein provide improved pressure management techniques by providing an improved pressure management system (e.g., a perfusion and suction pumping system) of a medical instrument such as a flexible or rigid elongated medical instrument (e.g., a percutaneous nephroscope) within organs of a patient's body.

As one example, the apparatus is a perfusion and suction pumping system for irrigation fluid to flush the stone fragment out of a patient's body and to maintain adequate visual clarity for surgery operation, while measuring and controlling the inside pressure of a patient's kidney during a PCNL procedure. The perfusion and suction pumping system include a pressure pump device, a pressure detector on the proximal end of a pressure measurement channel, a pressure relief valve, and a waste collector. The pressure pump device perfuses the irrigation fluid into a patient's body, the pressure sensor and pressure meter measure and display the inside-kidney pressure, and the pressure relief valve allows the irrigation fluid to be sucked out of the kidney to reduce inside-kidney pressure when it reaches a threshold. The threshold pressure may vary and can be selected based on the patient, the status of the kidney (e.g., size, swollenness, bleeding, number of stones), the size of the sheath and the flow speed of the irrigation fluid. In some embodiments, the upper threshold can be about 40 $cmH_2O$, about 35 $cmH_2O$, about 30 $cmH_2O$, about 25 $cmH_2O$, or about 20 $cmH_2O$, or any number therebetween, or higher, or lower. In some embodiments, the threshold can be about 17.2±5 $cmH_2O$ for F24 sheath. In some embodiments, the inside-kidney pressure is monitored in real time. In certain embodiments, the monitoring can be achieved using electrocardiography (e.g., the pressure sensor can be connected to an electrocardiograph). The perfusion and suction pumping system allows a physician to operate the surgery safely by real time monitoring and managing the inside pressure of a patient's kidney during a PCNL procedure.

In some embodiments, a small (e.g., 1 cm) incision is made in the patient's flank area and a sheath is placed through the incision into the kidney. A percutaneous nephroscope is then passed through the sheath in order to visualize the stone, break it up, and remove it from the body. Through the percutaneous nephroscope, irrigation fluid is pumped into a patient's kidney by a pressure pump device, and is pumped out of a patient's kidney together with the stone fragments through the perfusion and suction pumping system. The irrigation fluid can be an isotonic solution, optionally 5% saline. All waste fluid goes into a waste collector.

In one embodiment, a pressure measurement channel is placed between the sheath and the percutaneous nephroscope. A pressure detector is connected by a pressure measurement catheter that goes through the pressure measurement channel. The pressure detector includes a pressure sensor that collects real-time inside pressure information is fixed at one end of the catheter inside of the patient's kidney. The pressure detector that allows a physician to read the real-time inside pressure is located outside of the patient's body on the other end of the catheter. When the pressure reaches the physician's preset threshold level, a pressure relief valve can be used to reduce the inside pressure and to suck the irrigation fluid outside of the patient's body, which allows for visual clarity and safe operations by the physician. The system is easy to use and compatible with current medical devices to perform PCNL procedure.

Definitions

For convenience, certain terms employed in the specification, examples, and appended claims are collected here. Unless defined otherwise, all technical and scientific terms used herein have the same meaning as commonly understood by one of ordinary skill in the art to which this disclosure belongs.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the method/device being employed to determine the value, or the variation that exists among the study subjects. Typically, the term is meant to encompass approximately or less than 1%, 2%, 3%, 4%, 5%, 6%, 7%, 8%, 9%, 10%, 11%, 12%, 13%, 14%, 15%, 16%, 17%, 18%, 19% or 20% variability depending on the situation.

The use of the term "or" in the claims is used to mean "and/or" unless explicitly indicated to refer only to alternatives or the alternatives are mutually exclusive, although the disclosure supports a definition that refers to only alternatives and "and/or."

As used in this specification and claim(s), the terms "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited, elements or method steps. It is contemplated that any embodiment discussed in this specification can be implemented with respect to any method, system, host cells, expression vectors, and/or composition of the invention. Furthermore, compositions, systems, host cells, and/or vectors of the invention can be used to achieve methods and proteins of the invention.

As used herein the term "consisting essentially of" refers to those elements required for a given embodiment. The term permits the presence of additional elements that do not materially affect the basic and novel or functional characteristic(s) of that embodiment of the disclosure.

The term "consisting of" refers to compositions, methods, and respective components thereof as described herein, which are exclusive of any element not recited in that description of the embodiment.

The use of the term "for example" and its corresponding abbreviation "e.g." (whether italicized or not) means that the specific terms recited are representative examples and embodiments of the invention that are not intended to be limited to the specific examples referenced or cited unless explicitly stated otherwise.

Surgical Robotic System

Figure 1A:
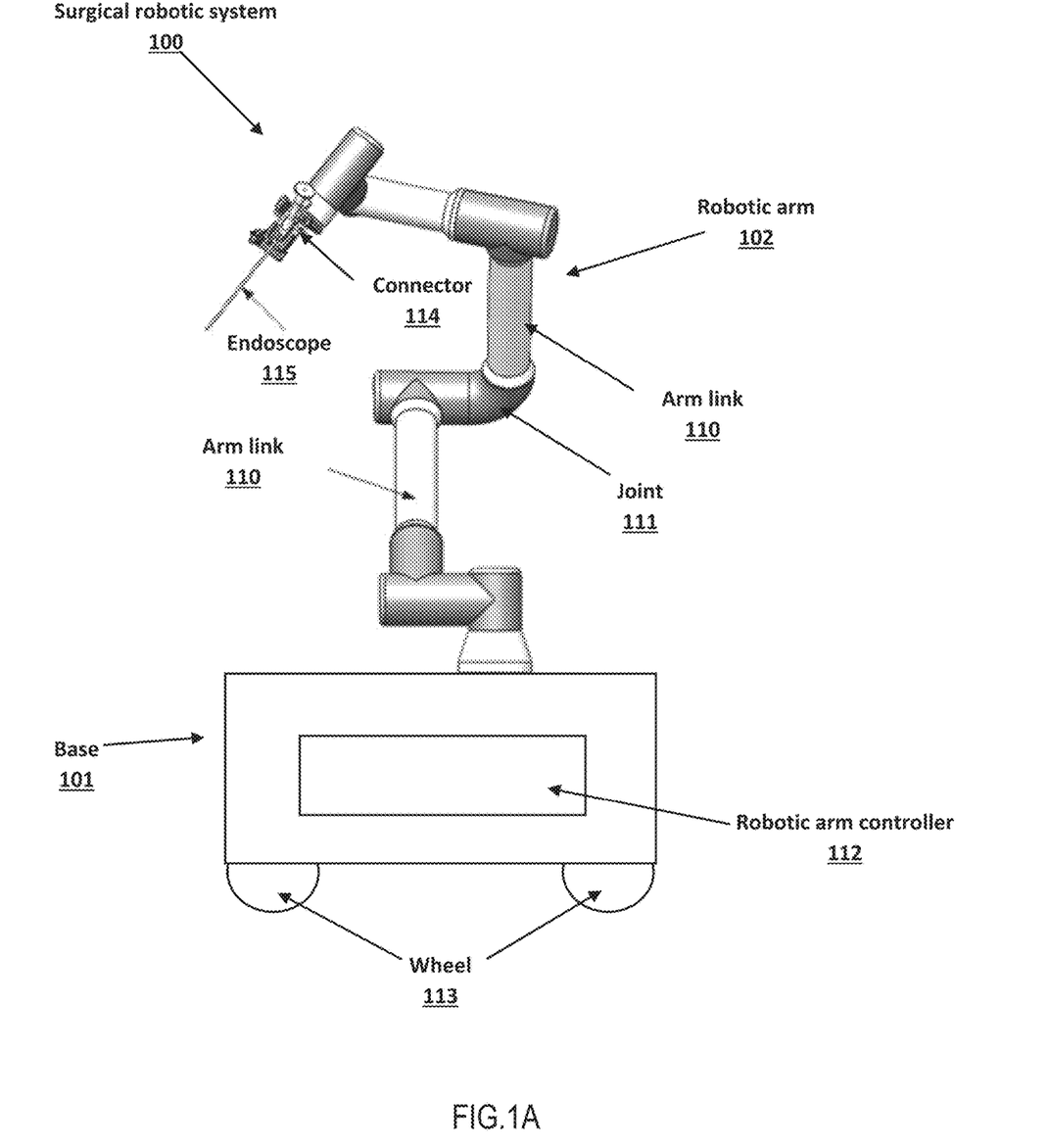
FIG. 1A shows an exemplary surgical robotic system, according to one embodiment.

FIG. 1A shows an exemplary surgical robotic system 100, according to one embodiment. The surgical robotic system 100 includes a base 101 coupled to one robotic arm, e.g., robotic arm 102. The base 101 is communicatively coupled to a command console, which is further described with reference to FIG. 2 below. The base 101 can be positioned such that the robotic arm 102 has access to perform a surgical procedure on a patient, while a user such as a physician may control the surgical robotic system 100 from the comfort of the command console. Though not shown in FIG. 1A for ease of view, the base 101 may include subsystems such as power sources and the like. The robotic arm 102 includes several arm links 110 coupled at joints 111, which provides the robotic arm 102 multiple degrees of freedom, e.g., seven degrees of freedom corresponding to seven arm links. The robotic arm controller 112 in the base 101 may also process and transmit control signals communicated from the command console.

In some embodiments, the base 101 includes wheels 113 to transport the surgical robotic system 100. During procedures, a user may control the robotic arm 102 using control devices such as the command console. Mobility of the surgical robotic system 100 allows efficient use of space in an operation room, and allows the robotic arm 102 to not interfere with people or other equipment during procedures.

Robotic arm 102 may be coupled to an endoscope 115 using a connector 114. The endoscope 115 can be removed and replaced with a different type of endoscope, for example, nephroscope or hysteroscope. The connector 114 is interchangeable based on the type of endoscope and can be customized for a certain type of surgical procedure. The robotic arm 102 can include a joint level torque sensing.

Figure 1B:
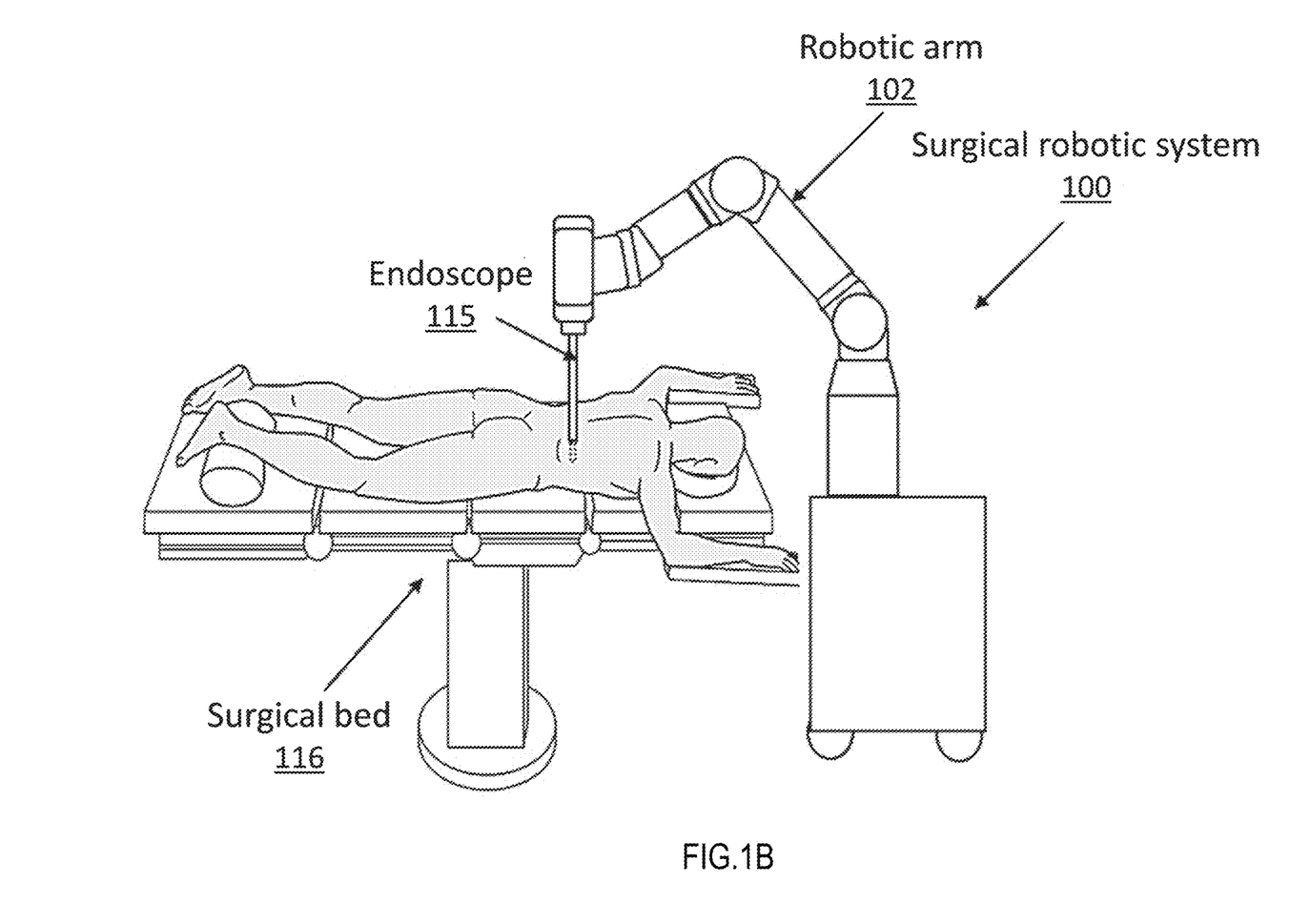
FIGS. 1B-1C show various perspective views of a robotic platform coupled to the surgical robotic system shown in FIG. 1A, according to one embodiment.
Figure 1C:
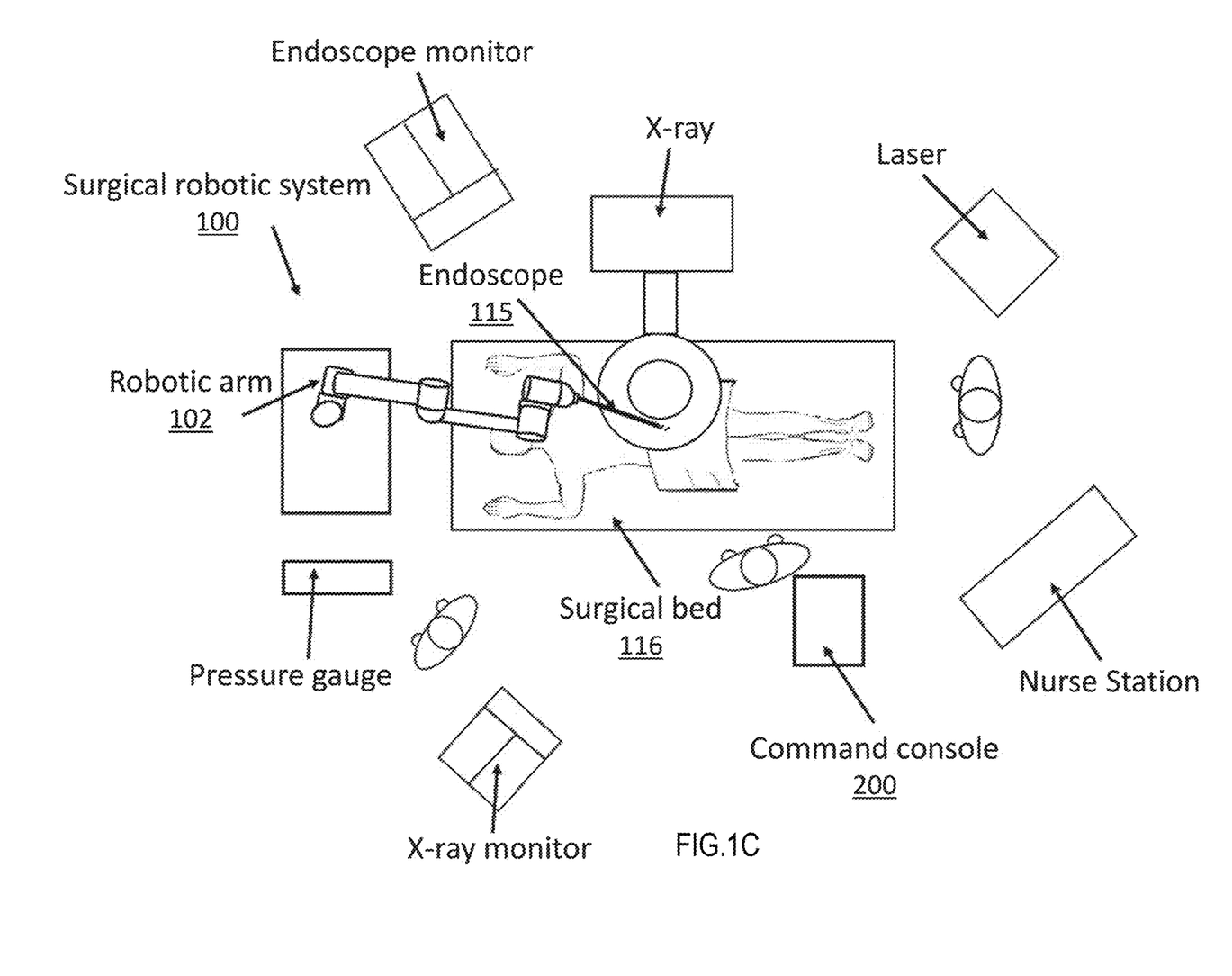

FIGS. 1B-1C show various perspective views of the surgical robotic system 100 coupled to a surgical bed 116, according to various embodiments. Specifically, FIG. 1B shows a side view of the surgical robotic system 100 with the robotic arm 102 manipulating the endoscope 115 to insert the endoscope inside a patient's body, and the patient is lying on the surgical bed 116. FIG. 1C shows a top view of the surgical robotic system 100 and the surgical bed 116, and the endoscope 115 manipulated by the robotic arm is inserted inside the patient's body.

Figure 1D:
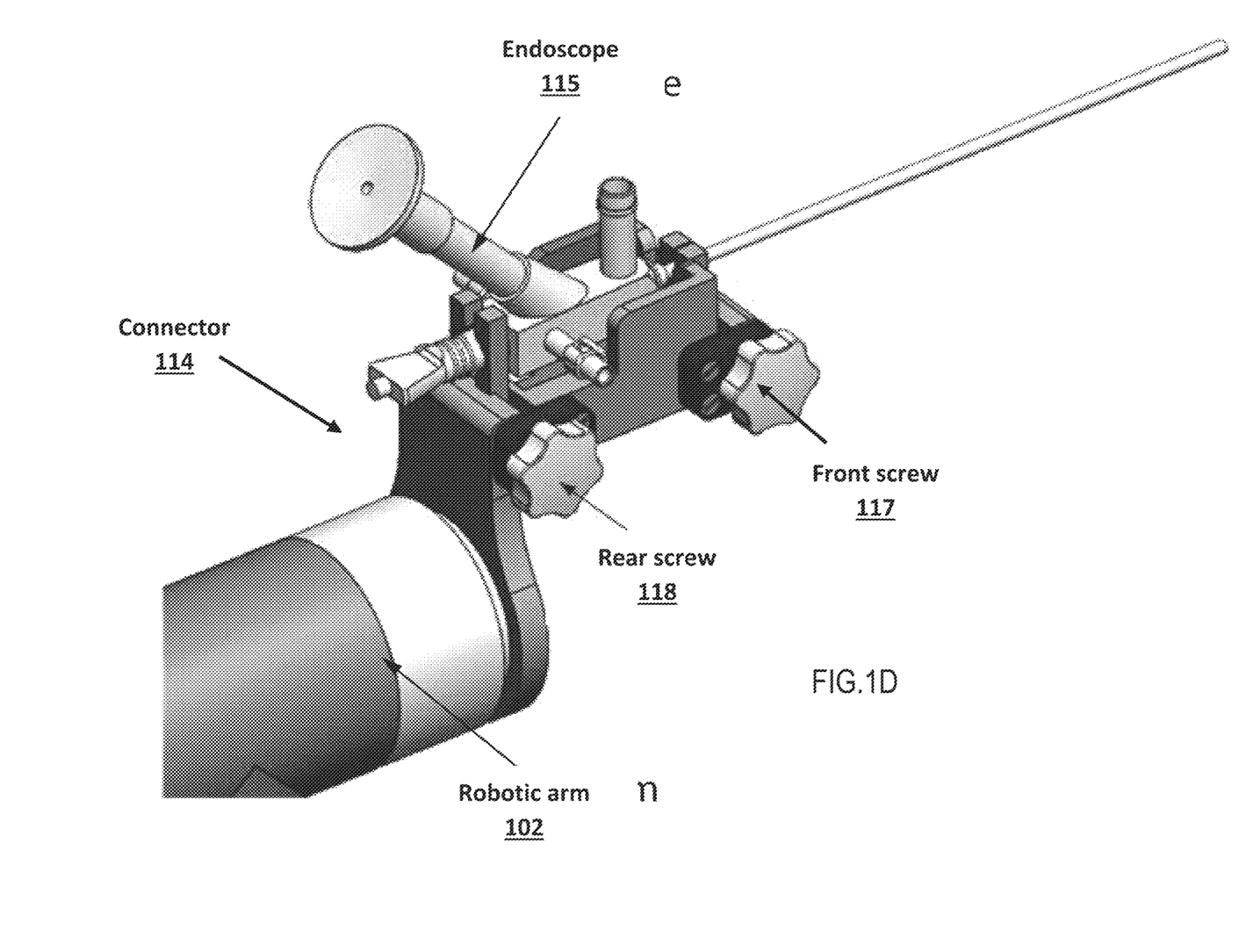
FIG. 1D shows one exemplary of connector that connects an endoscope to a surgical robotic arm shown in FIG. 1A, according to one embodiment.

FIG. 1D shows one example of connector 114, coupling the robotic arm 102 to hold and move an endoscope (e.g., percutaneous nephroscope) 115. The connector 114 includes a front screw 117 and a rear screw 118 to stabilize the position of the percutaneous nephroscope 115. The percutaneous nephroscope 115 is further described with reference to FIGS. 3A-3B below.

Command Console

Figure 2:
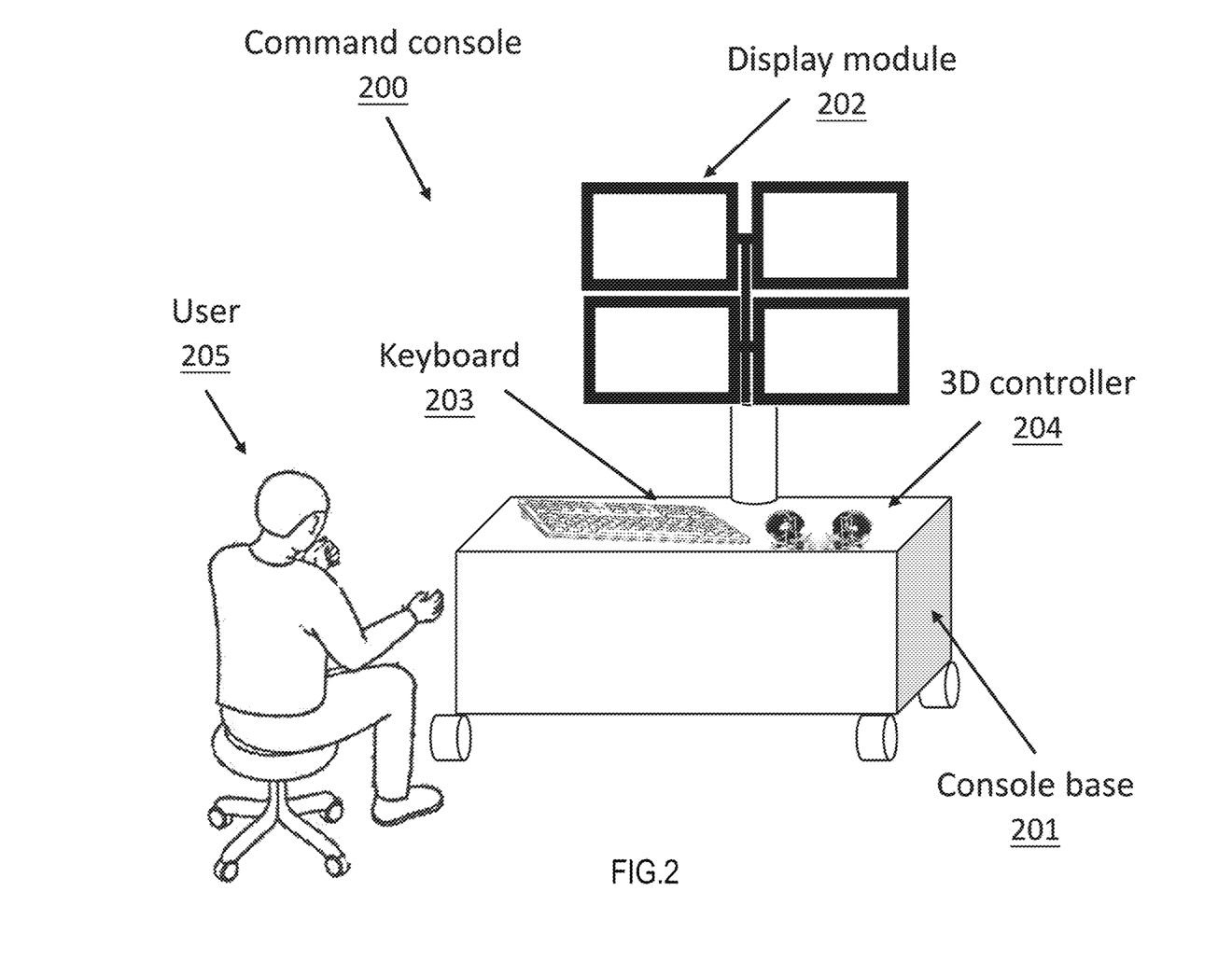
FIG. 2 shows an exemplary command console for a surgical robotic system, according to one embodiment.

FIG. 2 shows an exemplary command console 200 for surgical robotic system 100, according to one embodiment. The command console 200 includes a console base 201, display modules 202, e.g., monitors, and control modules, e.g., a keyboard 203 and 3D controller 204. A user 205, e.g., a physician, remotely controls the surgical robotic system 100 from an ergonomic position using the command console 200.

The console base 201 may interprets and process signals such as camera imagery, e.g., from the endoscope 115 shown in FIG. 1A. The console base 201 may also process commands and instructions provided by the user 205 through the control modules 203 and 204. In addition to the keyboard 203 and 3D controller 204 shown in FIG. 2, the control modules may include other devices, for example, computer mice and control pads.

The user 205 can control a surgical instrument such as the endoscope 115 using the command console 200 in a velocity mode. A tool center point is defined on the endoscope 115 by the robotic arm controller, and the dimension of the 3D controller is matched with the freedom degrees of the tool center point. In velocity mode, the user 205 remotely controls 6 freedom degrees motions of the endoscope 115 based on direct manual control using the 3D controller 204. The 3D controller 204 can provide haptic feedback to the user. For example, the 3D controller 204 vibrates to indicate the endoscope is touching the boundary of organ, must stop moving or rotating in current direction. The command console can also use a 3D image map of a patient to determine the safe zone, once the operation exceeds the boundary of organ or the safe zone, the alarm system and automatic protection program will be triggered to warn or stop or correct surgeons' operation, which will largely optimize the accuracy of the surgeons' operation, and improve patients' safety during surgeries.

Specifically, the robotic arm controller defines the point of entry (i.e., incision) as the tool center point. When the endoscope 115 approaches to the patients, the command console starts to restrict the movement of the endoscope 115. During the surgery, the command console only allows the endoscope 115 to move along its axial direction and rotate around the tool center point with pitch, roll, and yaw motion within a preset scope which is called a safety zone.

In some embodiments, user 205 can manually manipulate robotic arm 102 of the surgical robotic system 100 without using the command console 200. During setup in a surgical operating room, the robotic arm 102 may be configured in teach-show mode. Then the user 205 may move robotic arm 102, endoscope 115, and other surgical equipment to access a patient. The surgical robotic system 100 may rely on force feedback and inertia control from the user 205 to determine appropriate configuration of the robotic arm 102 and equipment. Specially, the user 205 can use the surgical robotic system 100 with such manual-manipulate mode even during the procedure, which allows more flexibility and better safety control.

The display modules 202 may display patient monitoring information such as electrocardiogram and blood pressure, intrarenal pressure values and curves, endoscopic images, perfusion and suction parameters, laser parameters, x-ray images and the like.

Endoscopes

Various endoscopes can be adapted into the system described herein, depending on the medical procedure to be performed. A matching endoscope can be selected according to the location and size of the lesion inside of the organ. For example, percutaneous nephroscope, ureteroscope, cystoscope, urethroscope, hysteroscope, arthroscope, spine endoscope, ventroscope, lacrimal duct endoscope, nasopharyngeal endoscope, otoscope and the like can be used depending on the organ, the lesion, and so on. In various embodiments, an endoscope can comprise a fluid inlet channel, a light source, a light conductor (e.g., fibers) and prisms.

Figure 3A:
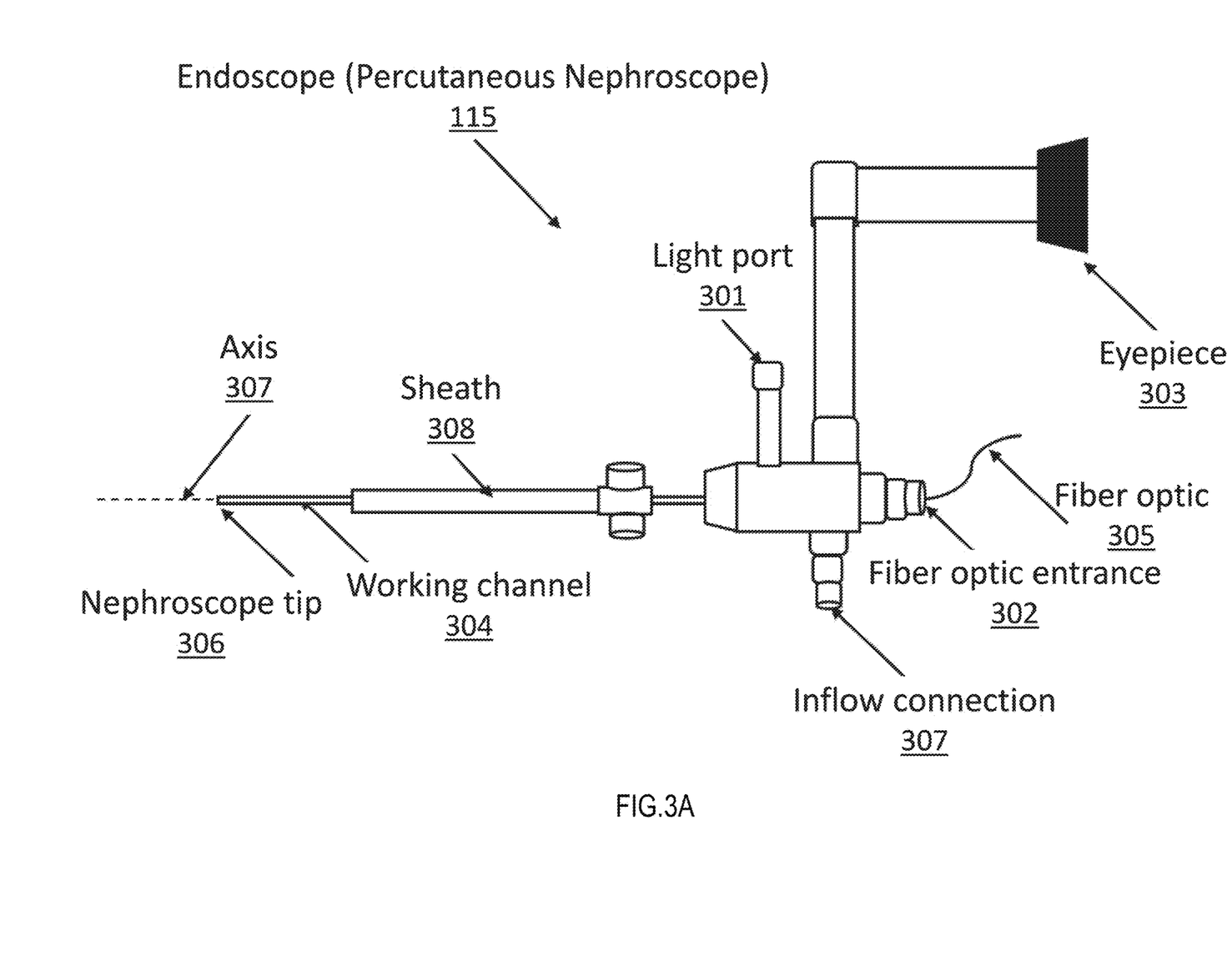
FIG. 3A shows a side view of an exemplary endoscope, according to one embodiment.

FIG. 3A shows a side view of an exemplary endoscope 115, according to one embodiment. The endoscope 115 is an optical instrument which allows one to inspect the renal cavitary system and to perform different therapeutic procedures under direct visual control. The endoscope 115 can be used to remove stones up to about 1 cm, stone fragments and small tumors. Endoscope 115 contains a sheath 308, an optical system and a working channel 304.

The optical system includes a light port 301, a fiber optic entrance 302, and an eyepiece 303. The fiber optic light port 301 is incorporated with working channel 304. During the medical procedure, light source goes through light port 301 and allows the fiber optic 305 that goes through the fiber optic entrance 302 and located in the central axis 307 of the working channel 304 to collect real-time images inside a patient's kidney. The real-time images can be visualized by a physician from the eyepiece 303. The optical system of an endoscope 115 ensure a clear visibility to assist a physician to perform the medical procedure.

The working channel 304 allows the insertion of a wide range of rigid accessories, such as lithothripter or different working elements (stone forceps, extraction probe, etc.), that are necessary to the medical procedure. The nephroscope tip 306 of the working channel 304 will be inserted into a patient's kidney and allows a physician to perform the medical procedure. Irrigation fluid is used to keep a clear vision and flush out the stone fragments. The same axial channel also ensures the irrigation fluid's flow that comes from the inflow connection 307. The outflow of the irrigation fluid is through the space between the working channel 304 and a sheath 308. The sheath 308 is further described with reference to the pumping system below.

Figure 3B:
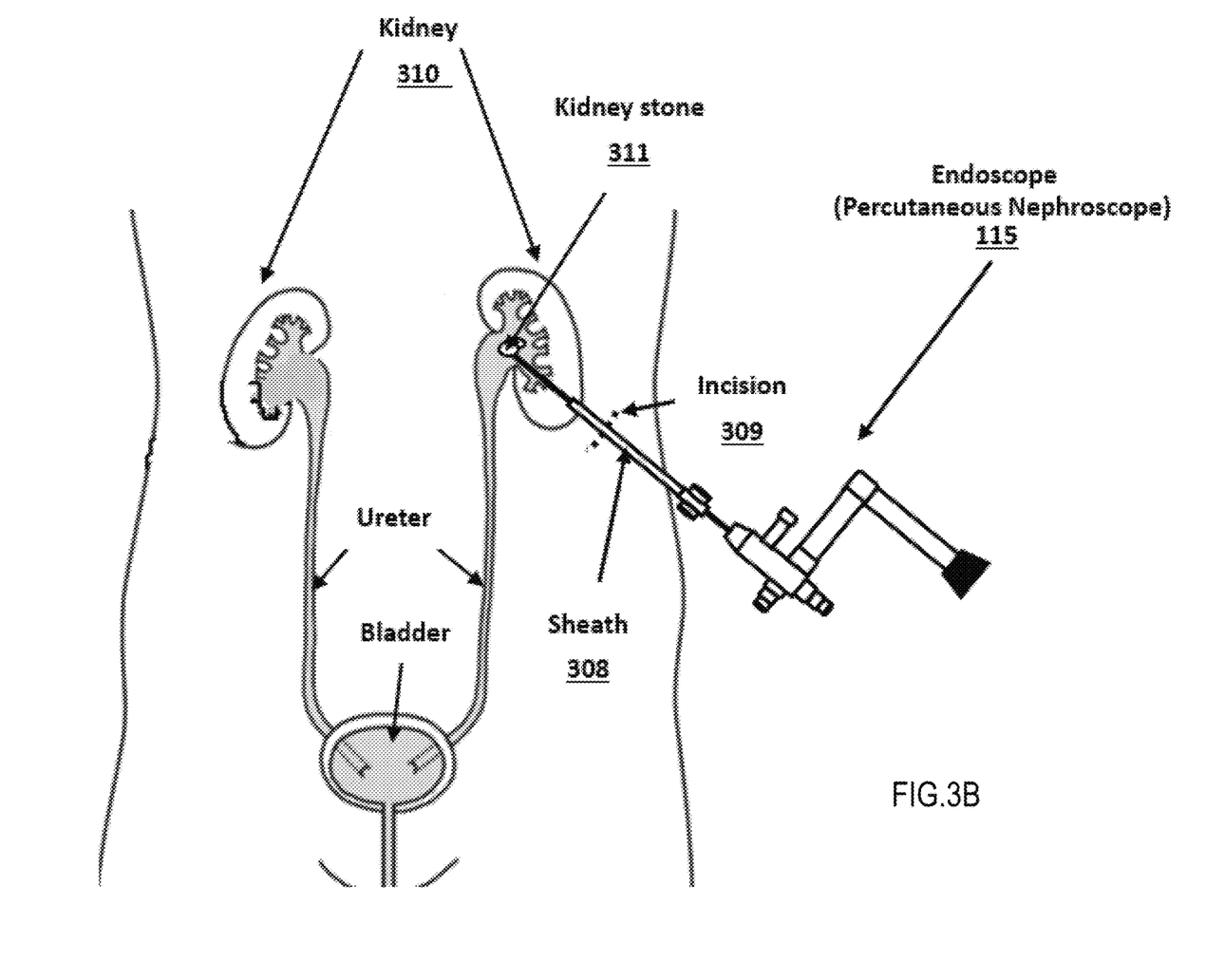
FIG. 3B shows a surgery operation view of the endoscope shown in FIG. 3A, according to one embodiment.

FIG. 3B shows a surgery operation view of the endoscope shown in FIG. 3A, according to one embodiment. During the medical procedure, a small (e.g., 1 cm) incision 309 is made in the patient's flank area and a sheath 308 is placed through the incision into the kidney under x-ray or ultrasound guidance. An endoscope (i.e., percutaneous nephroscope) 115 is then passed through the sheath 308 and inserted into the patient's kidney 310 for a physician to visualize the kidney stone 311. A medical device (e.g., laser device) can break up the stone in to fragments.

Pumping System

A system can be used to continuously pumping the irrigation fluid through the system. In some embodiments, a perfusion-suction pump can be included in the system to achieve continuous pumping.

Figure 4A:
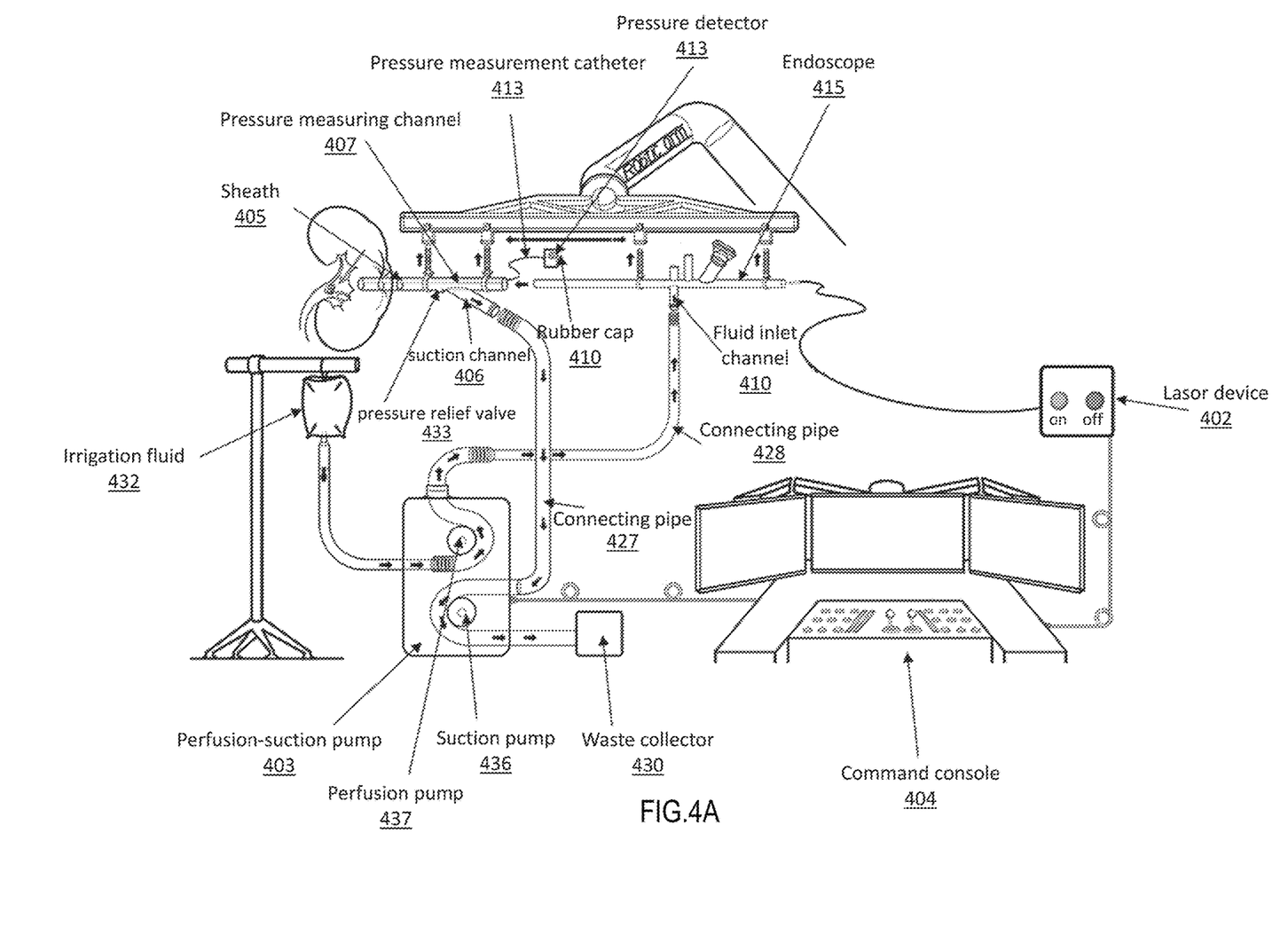
FIG. 4A shows an exemplary PCNL system, according to one embodiment.

FIG. 4A shows an exemplary PCNL system, according to one embodiment. A perfusion-suction system is shown which allows irrigation fluid to remove the kidney stone and to maintain adequate visual clarity for a physician to perform the medical procedure with real time pressure management. The perfusion-suction pumping system includes a perfusion suction pump 403, a pressure detector 414 with a pressure sensor inside, a sheath 405 with a suction channel 406, a rubber cap 410 at the rear end of the sheath 405. A pressure measuring channel 407 running along the sheath 405. The suction channel 406 is connected with a suction pump 436 through a connecting pipe 427. The water inlet channel 416 of endoscope 415 is connected with the perfusion pump 437 by a connecting pipe 428. During the operation, the endoscope 415 is inserted into the sheath 405 from the center of the rubber cap 410 at the rear end of the sheath 405. A pressure relief valve 433 that allows real time pressure release is located on the sheath 405.

At the beginning of the PCNL procedure, a physician turns on the perfusion suction pump 403. A small 1 cm incision is made in the patient's flank area and a sheath 405 is placed through the incision into the kidney under x-ray or ultrasound guidance. The endoscope 415 is inserted into the sheath 405 from the center of the rubber cap 410 at the rear end of the sheath to reach into the kidney. The perfusion pump 437 pumps irrigation fluid 432 into the endoscope 415 and then into the kidney. Then the suction pump 436 pumps the irrigation fluid 432 (containing fragmented kidney stones) out of the patient's body through the space between the endoscope 415 and the sheath 405. Then the irrigation fluid 432 will flow into the suction channel 406, and goes into a waste collector 430.

The sheath 405 has an intrarenal pressure measurement channel 407. A pressure measurement catheter 413 is placed inside of the pressure measurement channel 407. The distal end of the pressure measurement catheter 413 is placed inside of the kidney, and the proximal end of the pressure measurement catheter 413 is connected to the outside pressure detector 414. The pressure level of the perfusion-suction pump 403 can be adjusted automatically by the command console 404 or manually by a physician according to the real-time pressure measurement results. When the sheath 405 is blocked and the pressure in the kidney exceeds the safe pressure range, which can be 15-40 cmH$_2$O, the pressure relief valve 433 will be functioning to relieve the inside pressure of the kidney.

Figure 4B:
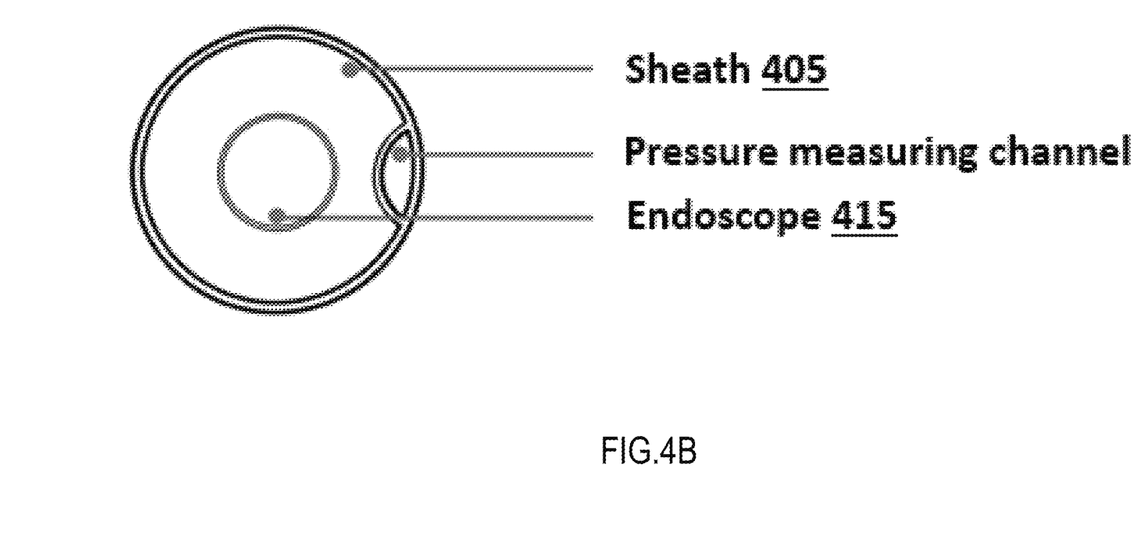
FIG. 4B shows the top view of an exemplary endoscope for use in connection with the system of FIG. 4A.

FIG. 4B shows the top view of an exemplary endoscope for use in connection with the system of FIG. 4A, according to one embodiment. The sheath 405 allows the endoscope 415 to reach into a patient's kidney. The pressure measuring channel 407 is on one side of the sheath 405 between the space of the sheath 405 and the endoscope 415.

Figure 4C:
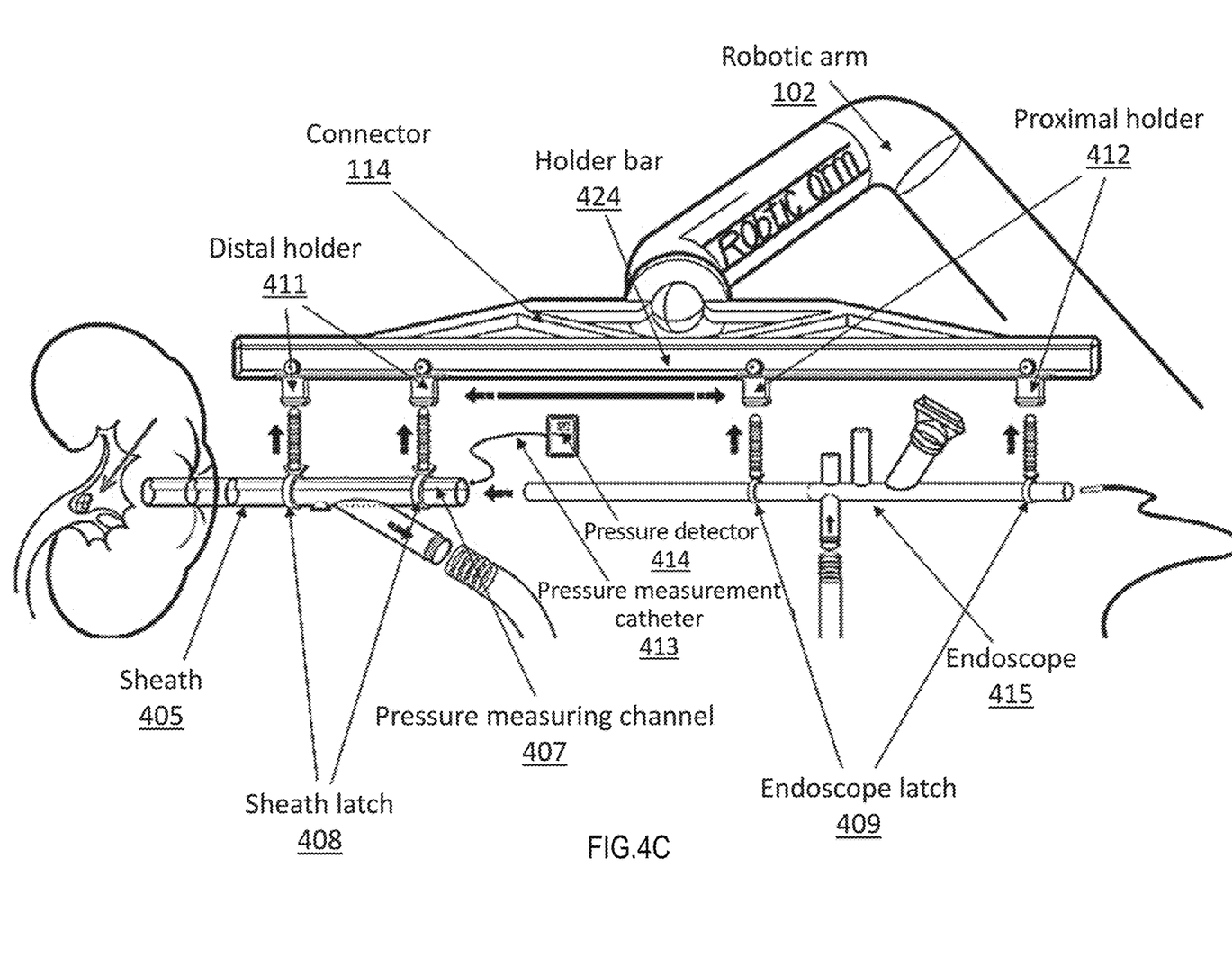
FIG. 4C shows the side view of an exemplary endoscope and sheath design in connection with the system of FIG. 4A.

FIG. 4C shows the side view of an exemplary endoscope and sheath design in connection with the system of FIG. 4A, according to one embodiment. The robotic arm 102 is connected to holder bar 424 via connector 114. The distal holder 411 of the holder bar 424 is connected to the sheath 405 with the sheath latch 408. The proximal holder 412 of the holder bar 424 is connected with the endoscope 415 with the endoscope latch 409. During the procedure, the distal holder 411 and the proximal holder 412 move in a coaxial motion. The distal holder 411 controls the depth and angle of the sheath 405 in the kidney, while the proximal holder 412 controls the endoscope 415 to move back and forth within the sheath 405.

Modifications

Modifications and variations of the described methods and compositions of the present disclosure will be apparent to those skilled in the art without departing from the scope and spirit of the disclosure. Although the disclosure has been described in connection with specific embodiments, it should be understood that the disclosure as claimed should not be unduly limited to such specific embodiments. Indeed, various modifications of the described modes for carrying out the disclosure are intended and understood by those skilled in the relevant field in which this disclosure resides to be within the scope of the disclosure as represented by the following claims.

INCORPORATION BY REFERENCE

All patents and publications mentioned in this specification are herein incorporated by reference to the same extent as if each independent patent and publication was specifically and individually indicated to be incorporated by reference.

What is claimed is:

1. An endoscopic surgical robotic system, comprising:
an endoscope pre-selected according to a lesion inside of an organ, wherein the endoscope comprises a fluid inlet channel for flowing an irrigation fluid to the organ;
a sheath for guiding the endoscope;
a suction channel located within the sheath for removing the irrigation fluid from the organ;
a pressure measuring channel located along the sheath, wherein the pressure measuring channel is connected to a pressure detector constructed to measure a pressure within the organ;
a pressure relief valve in fluid communication with the sheath, wherein once the pressure within the organ monitored via the pressure detector increases above a threshold, the pressure relief valve opens to allow removal of the irrigation fluid in the suction channel, thereby lowering the pressure within the organ;
a first holder for holding the sheath;
a second holder for holding the endoscope, wherein the first holder and the second holder are designed to move co-axially so as to move the endoscope in and out of the sheath; and
a robotic arm for controlling a movement of the sheath, wherein the robotic arm is connected to the first holder.

2. The endoscopic surgical robotic system of claim 1, further comprising a puncturable cap located at a distal end of the sheath through which the endoscope is inserted into the sheath.

3. The endoscopic surgical robotic system of claim 1, further comprising a perfusion suction pump for continuously pumping the irrigation fluid into the organ and continuously removing the irrigation fluid.

4. The endoscopic surgical robotic system of claim 1, further comprising a suction pump in fluid communication with the suction channel, for pumping out and removing the irrigation fluid from the organ.

5. The endoscopic surgical robotic system of claim 1, wherein the pressure measuring channel is located inside of the sheath.

6. The endoscopic surgical robotic system of claim 1, wherein the pressure detector monitors the pressure within the organ in real time and is connected to an electrocardiograph.

7. The endoscopic surgical robotic system of claim 1, wherein the threshold is pre-determined according to the lesion, the organ, the sheath and/or a flow speed of the irrigation fluid.

8. The endoscopic surgical robotic system of claim 1, wherein the first holder is constructed to removably hold the sheath via a first latch, and/or the second holder is constructed to removably hold the endoscope via a second latch.

9. The endoscopic surgical robotic system of claim 1, further comprising a holder bar for hanging the first holder and the second holder such that the first holder and the second holder are movable back and forth along the holder bar, wherein the holder bar is connected to the robotic arm via a connector.

10. The endoscopic surgical robotic system of claim 1, wherein the robotic arm comprises a multi-degree-of-freedom actuator and a multi-degree-of-freedom control system, wherein the endoscope is fixed at an output end of the multi-degree-of-freedom actuator, and wherein a tool center point is defined on the endoscope by the multi-degree-of-freedom control system.

11. The endoscopic surgical robotic system of claim 10, further comprising a command console for controlling the robotic arm.

12. The endoscopic surgical robotic system of claim 11, wherein the command console comprises a 3D controller and a control host, wherein a dimension of the 3D controller is matched with freedom degrees of the tool center point, wherein the control host associates dimension information from a multi-dimensional sensor of the 3D controller with freedom degree information from the tool center point.

13. The endoscopic surgical robotic system of claim 12, wherein the 3D controller remotely controls the multi-degree-of-freedom actuator and the endoscope.

14. The endoscopic surgical robotic system of claim 12, wherein when the endoscope reaches a patient, the control host starts to restrict the endoscope to move along an axial direction of the endoscope and rotate around the tool center point with pitch, roll, and yaw motion within a preset scope of a safety zone.

15. The endoscopic surgical robotic system of claim 11, wherein the command console comprises a monitor module for displaying patient monitoring information.

16. The endoscopic surgical robotic system of claim 10, wherein the tool center point is an entry point for incision.

17. The endoscopic surgical robotic system of claim 1, further comprising a lithotripter for breaking up stones within the organ.

18. A method for performing percutaneous nephrolithotomy surgery, comprising using the endoscopic surgical robotic system of claim 1.

19. A method for performing surgery, comprising:
   inserting a sheath through a pre-cut incision on a patient, into an organ, wherein the sheath is held by a first holder;
   placing an endoscope into the sheath, wherein the endoscope is pre-selected according to a lesion inside of the organ and is held by a second holder, the endoscope comprises a fluid inlet channel for flowing an irrigation fluid to the organ, and wherein the sheath comprises a suction channel for removing the irrigation fluid from the organ;
   moving the first holder and the second holder co-axially so as to move the endoscope in and out of the sheath;
   controlling a movement of the sheath via a robotic arm connected to the first holder;
   pumping the irrigation fluid into the fluid inlet channel;
   removing the irrigation fluid from the organ through the suction channel; and
   monitoring pressure within the organ via a pressure detector connected to a pressure measuring channel located along the sheath, wherein once the pressure within the organ monitored via the pressure detector increases above a threshold, a pressure relief valve in fluid communication with the sheath opens to allow removal of the irrigation fluid in the suction channel, thereby lowering the pressure within the organ.

20. An endoscopic surgical robotic system, comprising:
   an endoscope pre-selected according to a lesion inside of an organ, wherein the endoscope comprises a fluid inlet channel for flowing an irrigation fluid to the organ;
   a sheath for guiding the endoscope;
   a suction channel located within the sheath for removing the irrigation fluid from the organ;
   a pressure measuring channel located along the sheath, constructed to measure a pressure within the organ and connected to a pressure detector;
   a pressure relief valve in fluid communication with the sheath, wherein once the pressure reaches a threshold, the pressure relief valve opens to allow removal of the irrigation fluid in the suction channel, thereby lowering the pressure within the organ;
   a first holder for holding the sheath;
   a second holder for holding the endoscope, wherein the first holder and the second holder are designed to move co-axially so as to move the endoscope in and out of the sheath;
   a robotic arm for controlling a movement of the sheath, wherein the robotic arm is connected to the first holder and comprises a multi-degree-of-freedom actuator and a multi-degree-of-freedom control system, wherein the endoscope is fixed at an output end of the multi-degree-of-freedom actuator, and wherein a tool center point is defined on the endoscope by the multi-degree-of-freedom control system; and
   a command console for controlling the robotic arm, wherein the command console comprises a 3D controller and a control host, wherein a dimension of the 3D controller is matched with freedom degrees of the tool center point, and wherein the control host associates dimension information from a multi-dimensional sensor of the 3D controller with freedom degree information from the tool center point.

* * * * *